May 11, 1943. G. O. RICHMOND 2,318,970
APPARATUS FOR TESTING GEARS
Filed Sept. 24, 1941 3 Sheets-Sheet 1

Inventor
GEORGE O. RICHMOND
By B. Schlesinger
Attorney

May 11, 1943.                G. O. RICHMOND                 2,318,970
                         APPARATUS FOR TESTING GEARS
                          Filed Sept. 24, 1941        3 Sheets-Sheet 2

Inventor
GEORGE O. RICHMOND
By
*B. F. Schlesinger*
Attorney

May 11, 1943. G. O. RICHMOND 2,318,970
APPARATUS FOR TESTING GEARS
Filed Sept. 24, 1941 3 Sheets-Sheet 3

Inventor
GEORGE O. RICHMOND
By
Attorney

Patented May 11, 1943

2,318,970

UNITED STATES PATENT OFFICE 2,318,970

APPARATUS FOR TESTING GEARS

George O. Richmond, Rochester, N. Y., assignor to Gleason Works, Rochester, N. Y., a corporation of New York Application September 24, 1941, Serial No. 412,116

5 Claims. (Cl. 33—179.5)

The present invention relates to apparatus for testing gears and particularly to apparatus such as may be used for testing the concentricity and the tooth spacing of gears.

Various forms of apparatus have been built for testing gears, but most of the equipment heretofore devised for testing the concentricity and tooth spacing of an individual gear has been constructed so that the test is made tooth by tooth. The gear is rotatably mounted on a suitable support, and one tooth of the gear is brought up against a fixed stop while a dial indicator or gauge is brought into contact with a different tooth. After one tooth is tested, the gear has to be indexed to bring the next tooth into position for test. In the past this has been accomplished by hand. The stop and the indicator are disengaged from the gear; the gear is turned manually one tooth; and then the stop and indicator are engaged with the gear again. A test with such prior equipment involves, therefore, considerable lost time.

With individual gear testing equipment as previously built, moreover, concentricity and tooth spacing can ordinarily be tested only at one point along the length of a tooth. Such a test, however, is not complete. A test taken at corresponding points along the length of successive teeth of a gear may show all of the teeth to be correct within the allowed tolerance, but they may not be correct actually. In hardening the gear, the teeth may have become warped or distorted along their length and there may be, in fact, errors in gear cutting along the length of the teeth. Inaccuracies of this nature can only be discovered by a check of the full length of the teeth, and for such a check a running test of the gear pair has heretofore been required.

Still further, much of such equipment as has heretofore been provided for testing individual gears has ordinarily been suitable for only one purpose. It might be used for testing the concentricity, or tooth spacing, but not for both these purposes.

One object of the present invention is to provide apparatus for testing gears individually on which the teeth of a gear can be indexed successively into testing position with great rapidity and without any necessity for disengaging the testing apparatus from the gear during the testing of successive teeth.

A further object of the invention is to provide apparatus for testing individual gears on which the concentricity, and tooth spacing may both be tested, and both tested simultaneously.

Still another object of the invention is to provide apparatus for testing individual gears for concentricity and tooth spacing with which errors along the length of a tooth will be disclosed.

A further object of the invention is to provide a simple and inexpensive apparatus for testing gears in pairs to show any errors in concentricity or tooth spacing.

Other objects of the invention will be apparent hereinafter from the specification and from the recital of the appended claims.

In testing apparatus built according to the present invention, an intermittent worm is preferably provided for controlling the position of the gear under test. This worm may be so constructed that its continuous rotation will cause the gear being tested to be held stationary intermittently while the test is made on each of its teeth successively and to be rotated intermittently to bring the teeth of the gear successively into position for test.

For testing the concentricity or tooth spacing of an individual gear, a very simple testing fixture may be built according to this invention. This may consist of a post or stud on which the gear to be tested is rotatably mounted, an intermittent worm for rotating the gear which may be meshed directly with the gear, and a dial indicator or gauge which may be mounted to engage a tooth of the gear at a point spaced from the point of engagement of the worm with the gear. For testing the gear, the operator rotates the intermittent worm continuously. As the worm rotates, each tooth of the gear is held stationary successively in an exactly predetermined position long enough for the operator to read on the gauge the position of another tooth. Then the gear is rotated to bring the next tooth into gauging position. The gauge readings will show whether the gear is concentric or not and whether the spacing of its teeth is correct or not.

For testing the tooth positions of a pair of gears, testing apparatus of quite simple form also may be built according to this invention. All that is required is a pair of supports for the gears to be tested which will hold the gears in meshing relation, an intermittent worm for engaging and driving one of the gears, and a dial gauge to measure the motion transmitted to the other gear. The gauge readings on successive teeth will be a measure of the accuracy of the tooth positions of the pair.

The two devices above referred to test the successive teeth of a gear only at single points along their lengths. As already stated it is within the purview of this invention to provide an apparatus for testing successively the teeth of a gear along the whole of the tooth length simultaneously. Such a fixture may be provided with a support for rotatably mounting the gear to be tested and with supports for rotatably mounting two master gears in such position that they mesh with the gear to be tested at opposite sides of the same. An intermittent worm is engaged with one of the master gears to drive the three gears, while a dial gauge is mounted on the fixture in position to contact with the teeth of the other master gear successively as that gear is rotated by the train. Since the teeth of the driven master gear mesh with the teeth of the gear, which is to be tested, along the whole length of its teeth, errors along the length of a tooth of the gear being tested will be transmitted to the master gear and read on the dial gauge. From the character of the gauge readings, a skilled operator can readily determine whether the error is an error of tooth spacing or of eccentricity, or both. Variations in gauge readings from tooth to tooth indicate errors in spacing, and where the error increases progressively in one direction for a portion of a revolution of the gear and then decreases again, an error in concentricity is indicated.

For testing the motion transmitted by a pair of gears, it is also within the contemplation of my invention to provide a fixture on which the pair may be mounted rotatably in mesh, and to drive one member through an intermittent worm and a master gear while the other member drives a second master gear, and to provide a dial gauge to contact the teeth of the second master successively to indicate any variations in the tooth positions of the pair under test.

Figure 1:
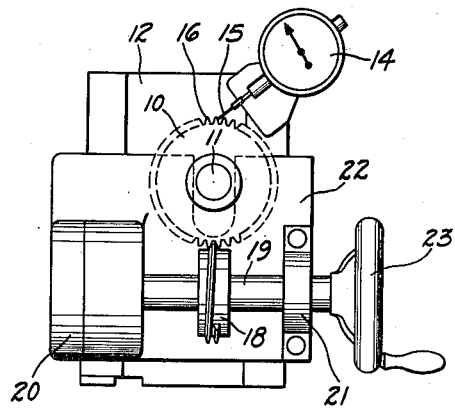
Fig. 1 is a plan view of one form of apparatus built according to this invention for testing the tooth spacing and concentricity of spur gears.

In Fig. 1, the gear to be tested is denoted at 10. It is rotatably mounted upon a stud 11 which is fixedly secured in the base 12 of the testing fixture. A dial gauge 14 is suitably mounted at one end of the base 12 in such position that its contact point 15 will engage with one of the teeth 16 of the gear 10 in a direction approximately normal to the tooth profile. An intermittent worm 18 is mounted to mesh with the gear 10 and to contact with a tooth thereof different from the tooth which is contacted by the dial indicator finger 15.

This intermittent worm 18 is keyed or otherwise secured to a shaft 19 which is journaled in suitable bearings 20 and 21 formed on a plate 22 that is slidably adjustable on the base 12. By manually moving the slide on the base, the worm can be adjusted into engagement with the gear 10. The shaft 19 may be rotated by means of a handwheel 23 to rotate the worm 18 and thereby cause the gear 10 to be revolved intermittently on its axis to pass successive teeth of the gear under the finger of the indicating gauge.

Figure 4:
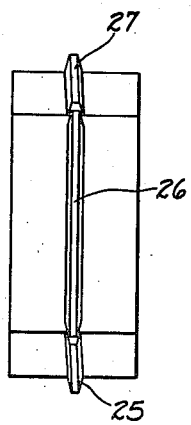
Fig. 4 is a view of this worm looking at one side thereof.
Figure 3:
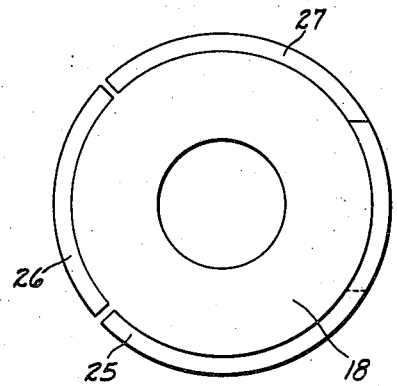
Fig. 3 is an end elevation of an intermittent worm such as may be employed in testing apparatus constructed according to the present invention.
Figure 5:
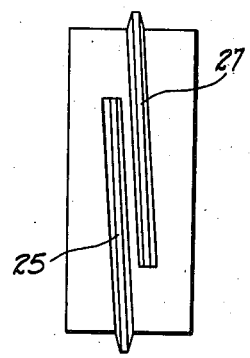
Fig. 5 is a view looking at the other side of the worm.

The intermittent worm 18 is preferably constructed as shown in Figs. 3 to 5, inclusive. It has an operating portion of at least one wrap or convolution. The entering portion of this wrap is denoted at 25, the intermediate portion at 26, and the leaving portion at 27. The entering portion 25 is a section of a worm thread which will mesh with the gear 10 being tested. The intermediate or dwell portion 26 is an arcuate segment of zero lead, formed with conical side surfaces and having the profile shape of a rack tooth of the pitch of the gear being tested. The leaving portion 27 is a segment of a worm which, like the segment 25, is conjugate to the gear 10. The segmental portions 25 and 27 are not in the same lead but are really two different starts or leads of a thread whose pitch is determined by the pitch of the gear to be tested.

The intermediate or dwell portion 26 is, as stated, without lead. Hence when it is rotating in engagement with the gear 10, the gear is held stationary. When the entering and leaving portions 25 and 27 of the intermittent worm are rotating in contact with a tooth of the gear 10, however, the gear is rotated. This rotational movement serves to index the gear from tooth to tooth to present successive teeth of the gear to the gauge. As the handwheel 22 is rotated, then, a step by step movement is imparted to the gear 10. The arcuate segmental portion 26 is of sufficient length to hold the gear stationary intermittently long enough for the operator to read the indicator 14 as it contacts corresponding sides of successive teeth of the gear. If the readings of the indicator 14 on successive teeth of the gear are all the same, then the tooth spacing is correct and the teeth of the gear are concentric of the gear axis, but if the readings vary, the spacing is inaccurate and if the variation is harmonic in nature then there is eccentricity present.

While Fig. 1 shows a fixture built for testing spur gears or cylindrical gears generally, it will be understood that this type of fixture may be used also for testing bevel and hypoid gears, by mounting the bevel or hypoid gear to be tested on the stud 11 and providing an intermittent worm 18 capable of meshing with and driving said bevel or hypoid gear.

Figure 2:
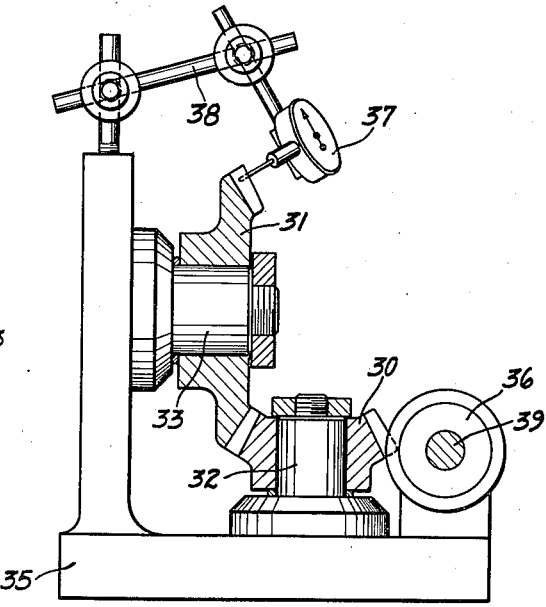
Fig. 2 is an elevational view with parts shown in section, of a fixture built according to this invention for testing the tooth spacing and concentricity of a pair of bevel gears.

Fig. 2 shows a fixture for testing the accuracy of tooth position in a pair of gears. The fixture specifically disclosed is one which may be employed for testing bevel gears, but it is to be understood that the invention is not so limited, but may be employed for testing cylindrical gears also.

In Fig. 2, 30 and 31 denote the two members of a pair of bevel gears which are to be tested. These gears are rotatably mounted on studs 32 and 33, respectively, which extend at right angles to one another and are rigidly supported by the right angular base plate 35. The two gears 30 and 31 are driven by an intermittent worm 36 which is constructed to mesh with the teeth of the gear 30 at the large ends thereof. This worm may be of the same general construction as the intermittent worm 18 previously described and it may be secured in any suitable manner to a shaft 39 which is suitably journaled in the base 35. A dial gauge 37 is provided to contact with the teeth of the gear 31 to measure the positions of the corresponding sides of successive teeth of this gear as they are brought into gauging position. The gauge 37 may be mounted in any convenient manner on the base plate 35. As shown, it is carried by a universally adjustable bracket of known construction which is designated as a whole at 38 and which is secured to the base plate 35.

As will be obvious, when the intermittent worm 36 is rotated, the gears 30 and 31 are alternately rotated and held stationary. During the stationary periods, the positions of the successive teeth of the gear 31 are read by the gauge 37 and during the rotary periods, the gears are rotated to bring successive teeth into gauging position. If the readings of the gauge 37 are uniform for all the teeth of the gear 31, then the gears 30 and 31 transmit uniform motion, but if the readings vary, then there is a variation in the motion transmitted. If the variations do not fall within the tolerances set, then the gears are rejected.

The concentricity testing fixture shown in Fig. 1 has a feature which has heretofore been characteristic of apparatus for testing the concentricity of individual gears. The dial gauge contacts with the teeth of the gear being tested only at one point along the length of the teeth with the result that if the teeth happen to be correct at that point, then the gauge shows no error and the gear is passed. In hardening gears, however, distortions frequently occur. The tooth surfaces may become warped longitudinally. Again, errors in cutting may enter into the picture and a tooth may not be uniform along its whole length.

Figure 6:
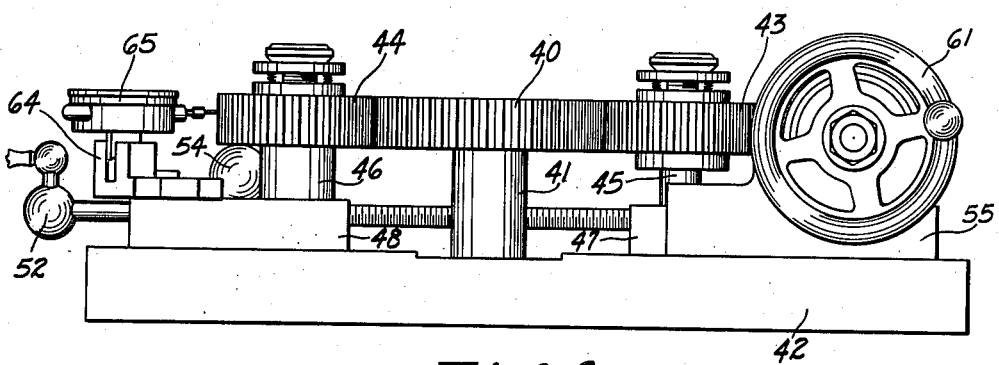
Fig. 6 is a side elevation of a fixture built according to the present invention for testing the tooth positions of a gear along their whole length.
Figure 7:
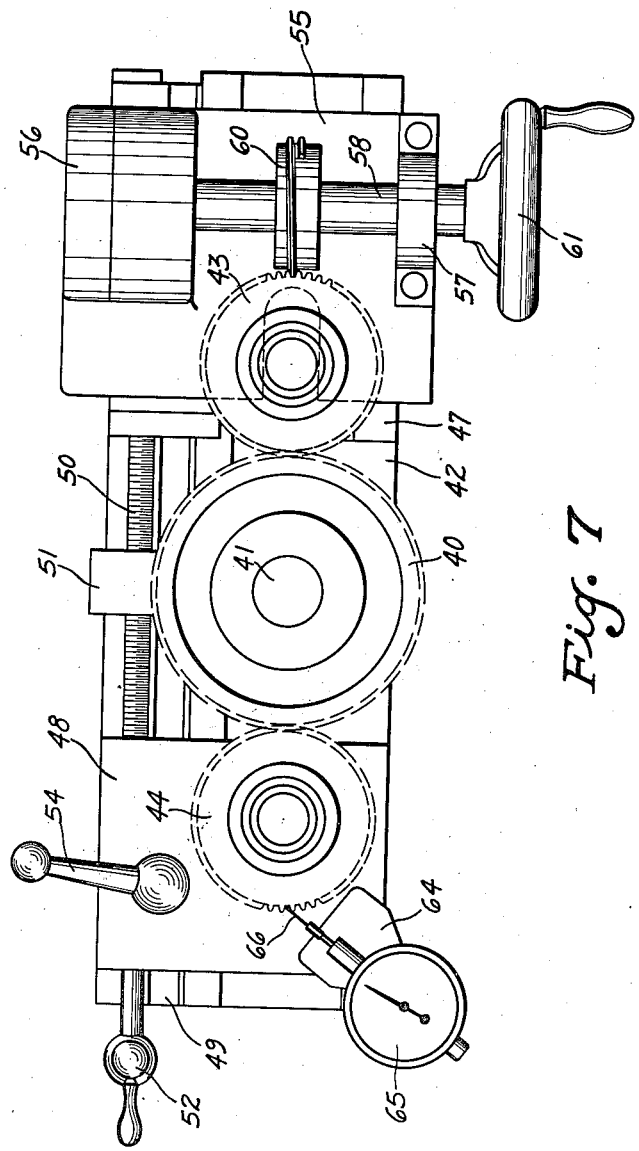
Fig. 7 is a plan view of this fixture.

Figs. 6 and 7 show a testing fixture constructed according to this invention which operates on a new principle and which enables the teeth of the gears to be tested not merely at a single point along the length of the teeth, but along the whole of the tooth length simultaneously. In these figures, 40 denotes the gear which is to be tested. It is rotatably mounted upon a stud 41 which is secured in the base 42 of th testing fixture. 43 and 44 denote, respectively, a pair of very accurately made master gears, which are of the same pitch as the gear to be tested and which are adapted to mesh with the gear to be tested during the testing operation. The master gear 43 is rotatably mounted on a stud 45 and the master gear 44 is rotatably mounted upon a stud 46. The studs 45 and 46 are integral with the blocks 47 and 48, respectively. These blocks are mounted to slide on the base 42 being guided by a way 49 formed on the upper surface of the base. The blocks 47 and 48 may be adjusted toward and from one another to bring the master gears 43 and 44 into engagement with the gear 40 at opposite sides thereof by a combination right and left hand screw shaft 50. This shaft is journaled in a block 51 that is integral with the base 42 and it threads at its opposite ends into the blocks 47 and 48. This screw shaft 50 is manipulated by the handle 52 which is secured to the shaft. The block 48 may be secured in adjusted position by a clamping lever 54.

Slidably mounted on the block 47 is a plate 55. Journaled in bearings 56 and 57 that are provided on this plate is a shaft 58. An intermittent worm 60 of the same type as the intermittent worm 18 is secured to or integral with this shaft 58. This worm may be rotated by a handwheel 61 which is secured to the shaft 58. By sliding the plate 55 manually on the block 47, the intermittent worm 60 can be engaged with the master gear 43, while by rotating the handle 52, the master gears 43 and 44 can be brought into mesh with the gear 40. There is a bracket 64 adjustably secured to the block 48. This bracket carries a dial indicator 65 in such position that its finger 66 will contact with one side of a tooth of the master gear 44.

When the handwheel 61 is rotated, the intermittent worm 60 will alternately rotate and hold stationary the train of gearing 43, 40, 44. During the periods when the dwell portion of the worm is in engagement with the master gear 43, the operator reads the indicator dial 65. If the dial readings vary for different teeth, then an error in tooth spacing of the gear 40 is indicated. If there is a harmonic nature about the variation in readings of the dial, then this is an indication that the gear being tested is eccentric. From the dial readings, therefore, the operator can determine whether the gear 40 being tested is accurate or not and from the character of those readings, he can determine wherein the error, if any, lies.

The master gears 43 and 44 contact with one side of the teeth of the gear 40 being tested for the full length of the teeth. Hence, variations in the teeth of the gear 40 along the length of the teeth will be disclosed.

Figure 8:
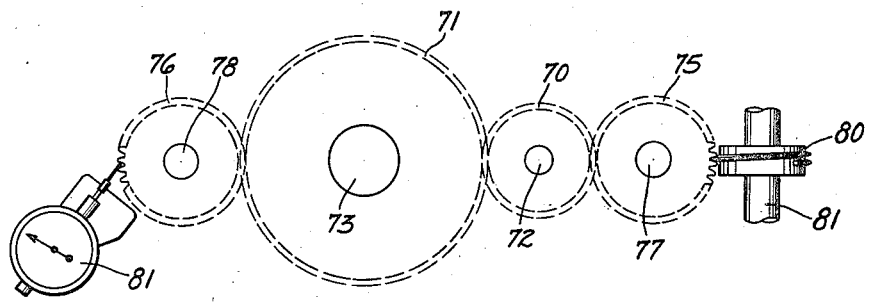
Fig. 8 is a diagrammatic view in plan showing a somewhat modified arrangement for testing a pair of gears.

A further extension of the present invention is illustrated diagrammatically in Fig. 8. Here 70 and 71 denote a pair of gears which are to be tested. These gears are rotatably mounted on studs 72 and 73, respectively, of a suitable testing fixture. A master gear 75 is meshed with the gear 70 and the master gear 76 is meshed with the gear 71. These master gears are rotatably mounted on studs 77 and 78, respectively, of the testing fixture. An intermittent worm 80 is engaged with the master gear 75. A dial gauge 81 is engaged with a tooth of the master gear 76. The intermittent worm 80 is secured to a shaft 81 rotatably mounted in the testing fixture. The dial gauge is suitably mounted on the fixture in gauging position. When the shaft 81 is rotated, intermittent motion is transmitted to the whole train of gearing 75, 70, 71, 76. By reading the gauge 81, then, the operator can determine the correctness of the positions of the teeth of the gears 70 and 71. If the readings are uniform for successive teeth of the master gear 76, the gears 70 and 71 have correctly positioned teeth, but if the readings vary, then the gears 70 and 71 have incorrectly positioned teeth and will transmit non-uniform motion. If the variation exceeds the tolerance allowable, then the gears are rejected.

While in Figs. 6 to 8, inclusive, apparatus is illustrated for testing spur gears, it will be understood that the invention is applicable to apparatus for testing tapered gears, also. Thus a bevel gear may be tested by driving it through a master bevel gear and allowing it to drive a second master bevel gear, and reading the positions of the teeth of the second master gear as they rotate successively into gauging position. The first master gear may be driven by an intermittent worm or other suitable driving means. It will further be understood that while several different embodiments of the invention have been described, the invention is capable of still further modification, and this application is intended to cover any variations, uses, or adaptations of the invention, following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. Apparatus for testing gears comprising a support for rotatably holding the gear to be tested, a master gear rotatably mounted on said support to have meshing engagement with said first named gear at one side of said first-named gear, a second master gear rotatably mounted on said support to have meshing engagement with said first named gear at a point spaced circumferentially from its point of engagement with the first master gear, and means for gauging the position of corresponding sides of successive teeth of one of said master gears when the several gears are rotated by rotation of the other master gear.

2. Apparatus for testing gears comprising a support for rotatably holding the gear to be tested, a master gear rotatably mounted on said support to have meshing engagement with the first named gear at one side of said gear, a second master gear rotatably mounted on said support to have meshing engagement with said first named gear at a point spaced circumferentially from the point of its mesh with the first master gear, an intermittent worm meshing with one of the master gears, and a gauge for testing the positions of corresponding sides of successive teeth of the other master gear as the several gears are rotated step-by-step on rotation of the worm.

3. Apparatus for testing gears comprising a support on which a pair of gears, that are to be tested, may be rotatably mounted in mesh, a master gear rotatably mounted on said support to have meshing engagement with one of said pair of gears, a second master gear rotatably mounted on said support to have meshing engagement with the other of said pair of gears, and means for measuring the positions of corresponding sides of successive teeth of one of said master gears as the several gears are rotated by rotation of the other master gear.

4. Apparatus for testing gears comprising a support on which a pair of gears that are to be tested may be mounted rotatably, a master gear rotatably mounted on said support to have meshing engagement with one of said pair of gears, a second master gear rotatably mounted on said support to have meshing engagement with the other of said pair of gears, an intermittent worm meshing with one of said master gears, and means for gauging the positions of corresponding sides of successive teeth of the other master gear as the several gears are rotated step-by-step on rotation of the worm.

5. Apparatus for testing gears comprising a support for holding a gear to be tested, a master gear rotatably mounted on said support and operatively connected with the gear to be tested, a second master gear rotatably mounted on said support and operatively connected with the gear to be tested, means for rotating the first-named master gear intermittently to rotate all of said gears intermittently, and means for gauging successively the position of successive teeth of the second master gear during the intermittent periods when said second master gear is stationary.

GEORGE O. RICHMOND.